United States Patent [19]

Nakagawa et al.

[11] 4,222,084

[45] Sep. 9, 1980

[54] MAGNETIC HEAD

[75] Inventors: Shiro Nakagawa, Chiba; Toshiki Aoi, Ichikawa, both of Japan

[73] Assignee: TDK Electronics Co., Ltd., Tokyo, Japan

[21] Appl. No.: 915,162

[22] Filed: Jun. 14, 1978

[30] Foreign Application Priority Data

Jun. 14, 1977 [JP] Japan .................................. 52/69448

[51] Int. Cl.$^2$ .......................... G11B 5/22; G11B 5/25
[52] U.S. Cl. .................................. 360/119; 360/122; 360/125
[58] Field of Search ............... 360/119, 120, 122, 125, 360/126–127, 110, 55; 336/212, 221

[56] References Cited

U.S. PATENT DOCUMENTS

| | | | |
|---|---|---|---|
| 3,064,087 | 11/1962 | Gabor | 360/119 |
| 3,313,889 | 4/1967 | Machinski | 360/119 |
| 3,371,164 | 2/1968 | Makimura | 360/119 |
| 3,373,416 | 3/1968 | Geurst et al. | 360/127 |
| 3,485,958 | 12/1969 | Bos et al. | 360/125 |
| 3,653,011 | 3/1972 | Donohue et al. | 360/119 |
| 3,984,874 | 10/1976 | Mano | 360/119 |

*Primary Examiner*—Alfred H. Eddleman
*Attorney, Agent, or Firm*—Armstrong, Nikaido, Marmelstein & Kubovcik

[57] ABSTRACT

Disclosed is a magnetic head used for a vertical magnetizing system comprising a core having a pair of leg portions and an auxiliary magnetic pole which is arranged so as to face both leg portions. A closed magnetic path is formed by the core and the auxiliary magnetic pole. A sharp edge is formed at each end of the leg portions. A magnetic recording medium passes through the gap between the sharp edges and the auxiliary magnetic pole. When the magnetic recording medium passes through the gap, a high density magnetic recording operation is performed by the magnetic field produced by each sharp edge. Moreover, the recording operation can be effectively carried out due to the closed magnetic path and the recording magnetic field magnetized on the magnetic recording medium can be read out by using the same magnetic head as the magnetic head which is used for the recording operation. In an embodiment of a magnetic head of the invention, a magnetic thin film is coated on each surface of the side walls of the leg portions.

11 Claims, 16 Drawing Figures

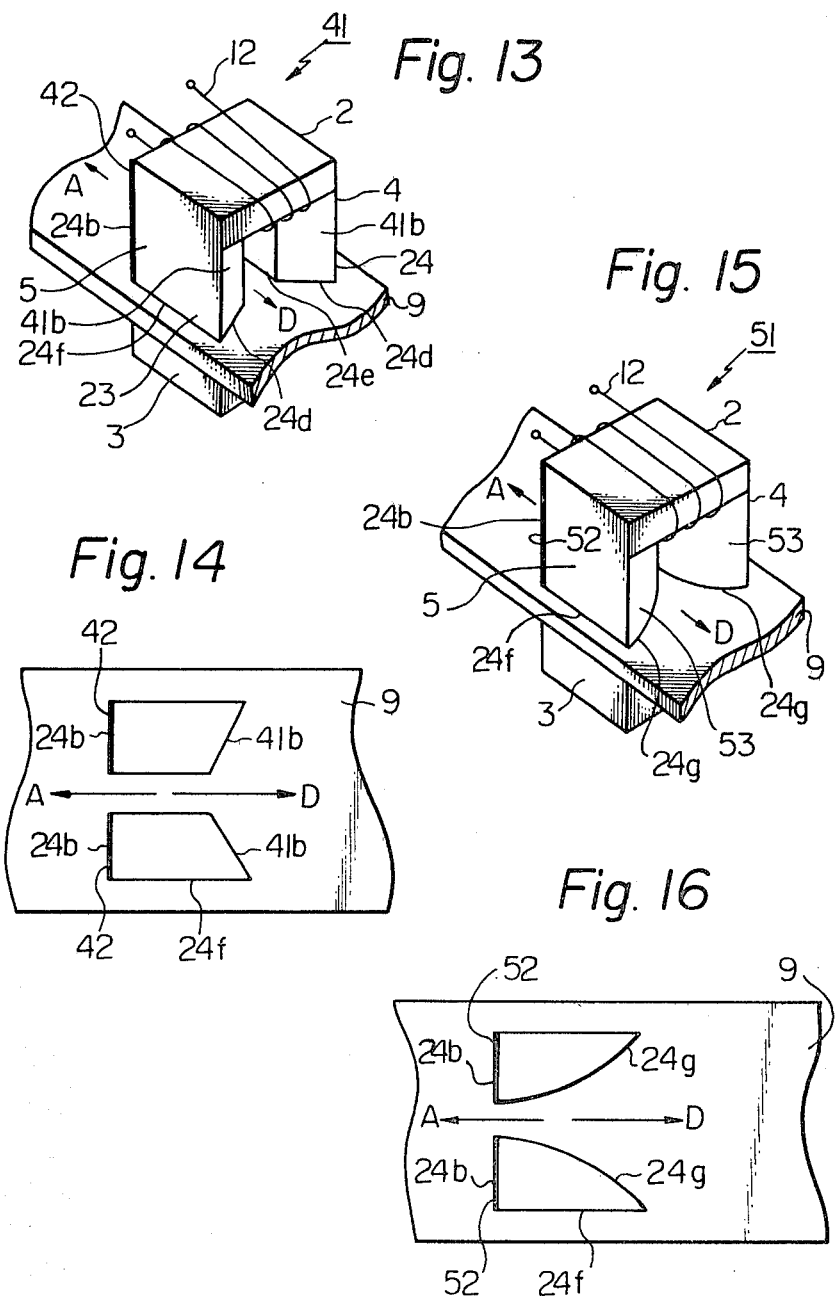

MAGNETIC HEAD

BACKGROUND OF THE INVENTION

This invention relates to a magnetic head construction, and more particularly to a magnetic head construction used for a vertical magnetization system.

Previously, a magnetic recording system has been widely used in which a ring-type magnetic head with a gap is used. By this magnetic head, a magnetic recording medium is magnetized in the direction of the relative motion between the magnetic recording medium and the magnetic head. In this recording system, to accomplish high-density magnetic recording, it is necessary to reduce the gap width of the magnetic head to as narrow as possible. Therefore, at present, magnetic heads with a gap width on the order of about $0.3[\mu]$ through $0.5[\mu]$ are used. However, such a gap width is approximately the minimum width which can be attained by machining.

In order to accomplish high-density magnetic recording without using the magnetic head with a narrow gap, two types of new magnetic recording systems have been proposed. One of them is a magnetic recordig system wherein a magnetic head with a magnetic gap is used and the direction of the magnetic gap is perpendicular to the direction of the relative motion between the magnetic head and the recording medium. Such a magnetic recording system is disclosed in the Japanese Laid Open Publication No. Sho. 50-81505 and in U.S. Pat. No. 3,984,874. The other system which has been proposed is a so-called vertical magnetization system.

In the former system, although it is possible to increase the recording density, the system has a disadvantage that a number of recording signals are picked up at the same. As a result, the recording head can not be used as the reproducing head.

On the other hand, in the latter system, the magnetic head comprises a core having a coil, and a main magnetic pole which has a sharp edge and is arranged so as to face the coil. The magnetic recording medium is placed between the core and the main magnetic pole and, then, a recording magnetic field is produced between the core and the main magnetic pole. As a result, the effective component of the recording magnetic field is perpendicular to the magnetic surface of the magnetic recording medium, so that the magnetic recording medium is magnetized in accordance with the intensity of the effective component of the recording magnetic field. Although this system is capable of high density recording, since the magnetic path is open, it is difficult to read out the recorded signal.

SUMMARY OF THE INVENTION

It is, therefore, a general object of the present invention to provide a magnetic head which can perform high-density magnetic recording and, moreover, can use for both recording and reproducing operations.

It is another object of the present invention to provide a magnetic head which is constructed so as to prevent wear of the head.

It is a further object of the present invention to provide a magnetic head which is not effected by a noise signal from outside of the head and can develop a relatively high level reproducing output signal.

The magnetic head of the invention comprises a magnetic core consisting of a pair of magnetic leg portions, which are magnetically connected by means of a magnetic connecting member, and a winding wound around the magnetic core. The end portion of each magnetic leg portion faces a magnetic recording medium. At each of the end portions of these magnetic leg portions, only one sharp edge portion is formed, respectively, in such a way that the direction of the edge line in the sharp edge portion is approximately perpendicular to the direction of the relative motion between the magnetic head and the magnetic recording medium. Furthermore, one side wall of the sharp edge portion is formed so as to be perpendicular to the magnetic recording medium. An auxiliary magnetic pole is placed so as to face both end portions of the leg portions and the magnetic recording medium is inserted between the core and the pole.

When the relative motion between the magnetic head and the magnetic recording medium occurs and, at the same time, the signal to be recorded is applied to the winding, the applied signal is magnetically recorded on the magnetic recording medium in such a way that the medium is magnetized in perpendicular to the magnetic surface of the medium in accordance with the intensity of the magnetic field produced between the sharp edge portion and the auxiliary magnetic pole. As a result, the magnetic recording operation is performed in the mode of the vertical magnetization system. At the time of the producing operation, when the magnetically recorded portion in the magnetic recording medium passes between each sharp edge portion of the end portions and the auxiliary magnetic pole, the magnetically recorded information in this recorded portion is reproduced.

The magnetic head of the invention can be used as both a recording head and reproducing head. Due to the auxiliary magnetic pole, since a closed magnetic path is formed in the magnetic head, the effect of external noise can be reduced and, moreover, a higher reproducing output signal can be obtained as compared to the conventional magnetic head.

In an embodiment of the present invention, in order to prevent rapid wear of the core, each of the end surfaces of the leg portions is formed in such a way that it faces the magnetic recording medium and the periphery of each end surface has only one straight edge which is perpendicular to the relative motion. Therefore, even if the magnetic recording medium moves in such a condition that the end surface is in contact with the magnetic recording medium, it is possible to prevent rapid wear of the core so that the life of the core will be extended over that of the core described above.

In another embodiment according to the present invention, each rear side wall of the leg portions is formed so as to be perpendicular to the surface of the magnetic recording medium and magnetic thin film is coated on the rear side wall. Due to this magnetic thin film, a magnetic field which is perpendicular to the surface of the magnetic recording medium can be effectively obtained from the head by applying the recording signal to the coil during a recording operation. On the other hand, also due to the magnetic thin film, the component of the magnetic field recorded on the magnetic recording medium which is perpendicular to the surface of the magnetic recording medium can be effectively picked up by the magnetic head during a reproducing operation. As a result, a high level output reproducing signal can be obtained and undesirable effects due to external noise can be easily eliminated.

Other features and advantages of the present invention will be apparent from the following description taken in conjunction with the accompanying drawings.

BRIEF DESCRIPTION OF THE DRAWING

FIG. 13 is a perspective view of another modified form of the magnetic head illustrated in FIG. 11;

FIG. 14 is a bottom view of the magnetic head illustrated in FIG. 13;

FIG. 15 is a perspective view of a further modified form of the magnetic head illustrated in FIG. 11, and;

FIG. 16 is a bottom view of the magnetic head illustrated in FIG. 15.

DETAILED DESCRIPTION

Figure 1:
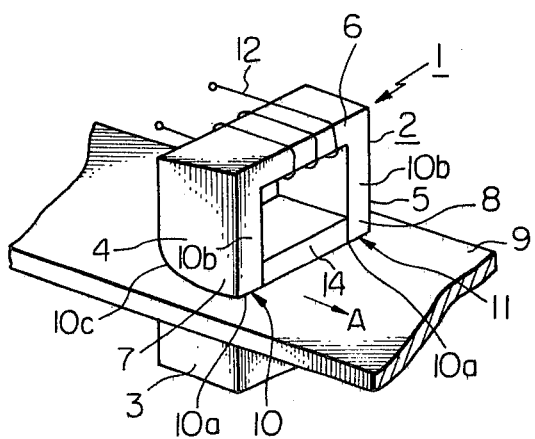
FIG. 1 is a perspective view of an embodiment of a magnetic head according to the present invention.

FIG. 1 is a perspective view of a magnetic head according to the present invention. The magnetic head 1 comprises a magnetic core 2 and an auxiliary magnetic pole 3. The magnetic core 2 consists of a pair of leg portions 4 and 5, and a connecting portion 6 magnetically connecting the leg portions 4 and 5. A spacer 14, made of a non-magnetic material, is provided between end portions 7 and 8 of the leg portions 4 and 5. The auxiliary magnetic pole 3 is arranged so as to face both the end portions 7 and 8, and to permit a magnetic tape 9 used as a magnetic recording medium to pass between the core 2 and the auxiliary magnetic pole 3. The magnetic tape 9 is moved in the direction indicated by the arrow A by means of a tape driving mechanism (not shown) and, as a result, a relative motion required for a recording or reproducing operation occurs between the magnetic head 1 and the magnetic tape 9.

At the end portion 7 of the leg portion 4, only one sharp edge portion 10 is formed, the edge line 10a of which is almost perpendicular to the direction of the above-mentioned relative motion, that is the direction indicated by the arrow A. The sharp edge portion 10 is formed by two surfaces of the leg portion 4. One is a perpendicular surface 10b of the leg portion 4, which is the surface extending straight upward from the edge line 10a. The other is an end surface 10c of the leg portion 4, which is a curved surface extending from the edge line 10a. The distance between the end surface 10c and the magnetic tape 9 naturally increases from the edge line 10a to the other end of the end surface 10c because of the curve in the end surface 10c. A sharp edge portion 11 is also formed at the end portion 8 of the leg portion 5, in the same manner as the sharp edge portion 10 of the end portion 7. Therefore, each portion of the sharp edge portion 11 corresponding to the portions 10a, 10b and 10c is indicated by the same reference numerals.

Reference numeral 12 represents a coil which is wound around the connecting portion 6. The coil 12 is used for producing a magnetic flux in the core 2 in accordance with the recording signal applied thereto or for deriving a reproducing signal in response to a magnetically recorded signal on the tape 9.

Figure 2:
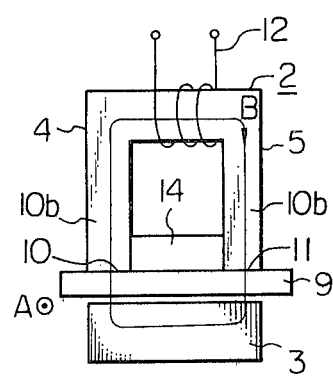
FIG. 2 is a front view of the magnetic head illustrated in FIG. 1.
Figure 3:
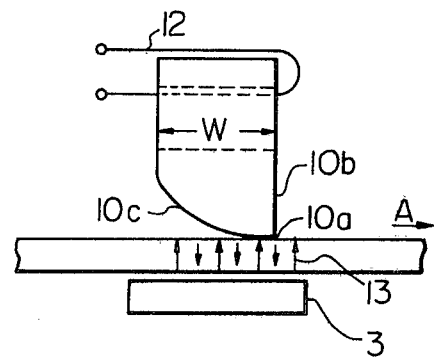
FIG. 3 is a side view of the magnetic head illustrated in FIG. 1.

In the magnetic head 1 of the present invention, when a recording signal is applied to the coil 12, magnetic flux occurs in the core 2 in response to the recording signal. Since the auxiliary magnetic pole 3 is arranged so as to face both of the end portions 4 and 5 of the core 2, the magnetic flux from one end portion flows to the other end portion via the auxiliary magnetic pole 3. Then, the magnetic path formed in the magnetic head 1 becomes a closed magnetic path as shown by the arrow B in FIG. 2. As a result, the direction of the recording magnetic field applied to the magnetic tape 9 is perpendicular to the surface of the magnetic tape 9. In this case, since the perpendicular surfaces 10b extend straight up from the edge line 10 which comes in contact with the tape 9, as shown in FIG. 3, the recording magnetic field between the end portion 7 and the auxiliary magnetic pole 3 is forcused between the edge line 10a and the auxiliary magnetic pole 3. Therefore, the magnetic tape 9 can be magnetized in the mode of the vertical magnetizing system and, the magnetic recording density in this case is almost equal to that in the prior art. Moreover, since the closed magnetic path is formed by the core 2 and the auxiliary magnetic pole 3, even if a plurality of magnetic heads are closely arranged, the amount of cross-talk between them is smaller.

As each of the end portions 7 and 8 includes the perpendicular surface and gentle curved surface, although the recorded magnetic field from the portion of the magnetic tape which corresponds to the width W of the core 2 (shown in FIG. 3) effects the magnetic head 1 at the time of the reproducing operation, the magnetic flux which effects the gentle curved surface, that is, the end surface 10c, varies slowly with time. Therefore, the magnitude of the output signal from the coil 12, which is proportional to the magnitude of the change of the magnetic flux from the portion of the tape 9 corresponding to the end surface 10c, is extremely small. However, when the recorded portion of the tape 9 passes the sharp edge portion 10, since a large change in magnetic flux occurs in the core 2, a large reproducing output signal is developed in the coil 12. Namely, the reproducing signal is developed due to the magnetic field passing through the edge line 10a. Therefore, the magnetic field in the tape 9 recorded at a high recording density can be reproduced, despite the fact that the width W of the core 2 is wide. Since the closed magnetic path is also constructed by the core 2 and the auxiliary magnetic pole 3 in the reproducing operation, undesirable effects due to an external noise signal can be reduced.

The demensions of the magnetic head may be, for example, as follows.

Thickness of the pole piece: 5 to 20[$\mu$]

Thickness of the spacer: 10 to 20[$\mu$]

Width W of the magnetic head: approx. 100[$\mu$] However, the value of W may be larger than 100[$\mu$].

In the magnetic head described above, since each of the edge portions 10 and 11 is in contact with the magnetic tape 9 only over a small area, the edge portions 10 and 11 tend to wear easily. To prevent this disadvantage, that is, to prevent the edge portions 10 and 11 from wearing easily, a non-magnetic material may be provided on each perpendicular surface 10b by adhesives or the like.

In addition, when a non-magnetic material with high conductivity is used for the spacer, it is possible to effectively transmit the magnetic field produced from the magnetic head to the magnetic tape. Moreover, according to the magnetic head of the present invention, when a d.c. bias current is used at the time of the recording operation, the pattern of the recorded magnetic field becomes the pattern indicated by the arrows designated by the reference number 13 in FIG. 3. Therefore, it is possible to prevent the magnetic flux from being shorted at the pole piece. As described above, the magnetic head according to the present invention has both the advantages of high-density recording in the vertical magnetization system, and high-output and low-noise in the conventional ring-type head.

Figure 4:
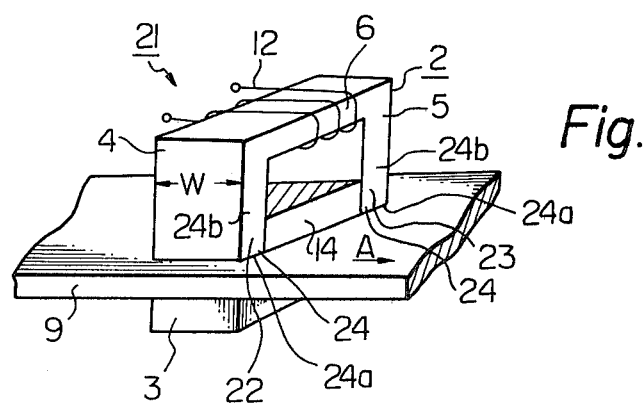
FIG. 4 is a perspective view of another embodiment of a magnetic head according to the present invention.

In FIG. 4 there is illustrated another embodiment of the magnetic head according to the present invention, which is constructed so as to prevent wear of the head. In FIG. 4, a magnetic head 21 is basically constructed in the same manner as the magnetic head 1 illustrated in FIG. 1, except for the shape of each end portion of the leg portions 4 and 5. Therefore, in FIG. 4 the portions except for the end portions of the leg portions are represented by the same reference numbers as the corresponding portions in FIG. 1.

Figure 5:
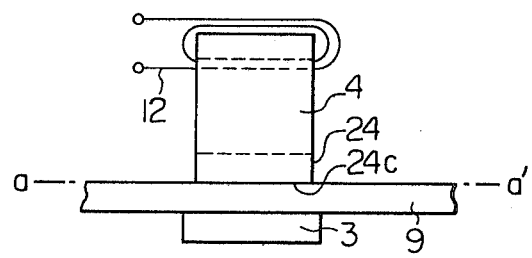
FIG. 5 is a side view of the magnetic head illustrated in FIG. 4.

In the magnetic head 21, sharp edge portions 24 are formed at the end portion 22 and, end surface 24c of the end portions are formed as a plane surface so that they face the magnetic tape 9 in parallel condition, as shown in FIG. 5. The sharp edge portion 24 is formed by the end surface 24c and a perpendicular surface 24b. The direction of the edge line 24a of the sharp edge portion 24 is perpendicular to the direction of the relative motion shown by the arrow A.

Figure 6:
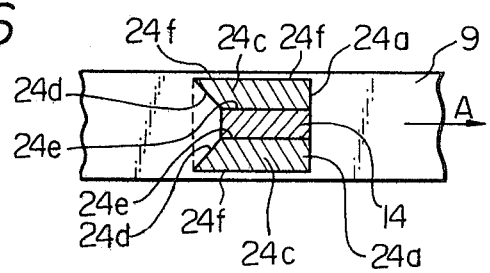
FIG. 6 is a sectional view taken substantially along the line a—a' in FIG. 5.
Figure 7:
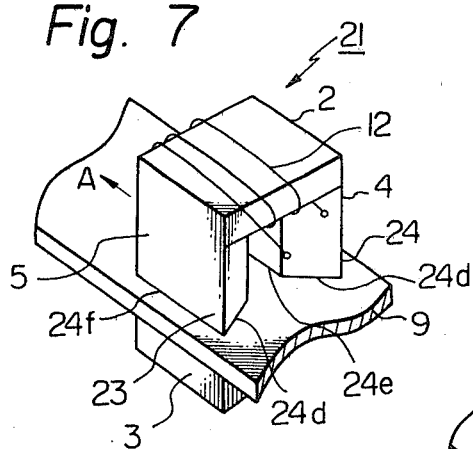
FIG. 7 is another perspective view of the magnetic head illustrated in FIG. 4.

The configuration of the end surface 24c is a trapezoid, as shown in FIG. 6 and the edge line 24a is one of the non-parallel edges of the trapezoid. Therefore, the direction of another edge 24d of the non-parallel edges of the trapezoid is not perpendicular to the direction shown by the arrows A. As will be seen from FIGS. 4 through 7, another end portion 23 is also formed in a shape similar to the shape of the end portion 22. Therefore, each portion of the end portion 23 is represented by using the same reference numeral as use for the corresponding portion of the end portion 22. Each of the end surfaces 24c is in contact with the magnetic tape 9 or closely faces the magnetic tape 9.

Since the operation of recording a signal or the operation of reproducing a signal is carried out on the basis of the following equation, $$V = \frac{d\phi}{dt} \quad (1)$$

where $\phi$ represents the value of the density of the magnetic flux, V represents the value of an output signal voltage, the recording operation is carried out at the moment when the magnetic tape separates from the magnetic head. That is, the edge line 24a magnetically records the signal applied to the coil 12. On the other hand, although the edge line 24a and the edge line 24d of the end surface 24c reproduce the magnetically recorded signal, since the direction of the edge line 24d does not coincide with the direction of the edge line 24a, due to the so-called azimuth loss, the magnetizing action in the edge line 24d is small. Therefore, substantially, only the edge line 24a acts as the magnetizing edge line. Since the directions of edge lines 24e and 24f are the same as the direction of the relative motion between the head 20 and the tape 9, the values of the equation (1) for these edge lines 24e and 24f are extremely small. Accordingly, these edge lines 24e and 24f do not act as magnetizing edges. On the other hand, when the magnetic tape 9 moves in the direction opposite to the direction indicated by the arrow A, the magnetic recording operation is carried out at the edge line 24d at the moment when the magnetic tape 9 separates from the edge line 24d. In the case where the recording operation is carried out at the edge line 24d, the reproducing operation is also carried out at the edge line 24d. Although the reproducing signal is also obtained from the edge line 24a in this case, the signal is extremely small due to the azimuth loss.

The closed magnetic path is also formed in this embodiment in the same manner as with the head 1 illustrated in FIG. 1, and the signal to be recorded is magnetically recorded on the magnetic tape 9 in the mode of the vertical magnetizing system. In this embodiment, since each end surface 24c is flat, the core 2 is in contact with the tape 9 over a large area. As a result of this, the magnetic head 20 can be used for a long time without wear.

Figure 8:
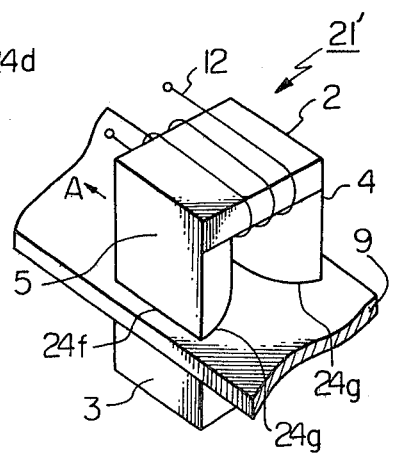
FIG. 8 is a perspective view of a modified form of the magnetic head illustrated in FIG. 7.
Figure 9:
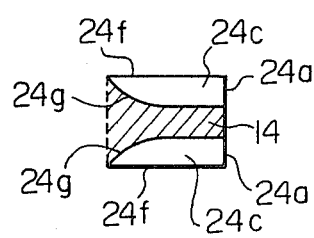
FIG. 9 is a bottom view of the magnetic head illustrated in FIG. 8.

FIGS. 8 and 9 are a perspective view of a modified embodiment of the above-mentioned magnetic head 21 and a bottom view of this modified embodiment. A magnetic head 21' is different from the magnetic head 21 in the shape of the end surfaces of the leg portions. The shape of each of the end surfaces 24c' of the leg portions 4 and 5 in the magnetic head 21' includes a curved edge line 24g instead of two straight edge lines 24d and 24e in the end surface 24c. That is, each of the end surfaces in the magnetic head 21' is formed in such a way that the distance between the leg portions is minimum at one end of the sharp edge portion 24 and gradually increases from that point along the curved edge lines 24g.

In the magnetic head 21', even if there is a horizontal component of the magnetic field in the tape 9, the magnetic head 21' does not respond to this magnetic component. Therefore, the magnetic head 21' is able to pick up the vertical component of the magnetic field in the magnetic tape 9. That is, due to the curved edge 24g, since the change ratio of the magnetization on the basis of the magnitude of the horizontal component is small, the output level due to the horizontal component is small. In addition, when considering the reproducing output, the polarity of the horizontal component of the magnetization is equal to that of the vertical component of the magnetization at the edge line 24a. Therefore, since the horizontal component is read out as a part of the vertical component, no interfere occurs. In addition, since the magnetic head 21', illustrated in FIG. 8, is not effected by the horizontal component of the magnetization and the head 21' can pick up the signal in response to the vertical component, it is possible to improve the characteristics of the S/N ratio in the reproducing output signal over those of the conventional head.

Figure 10:
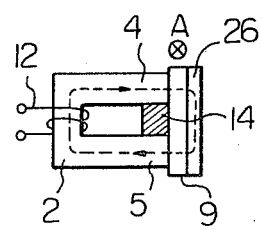
FIG. 10 is a front view of a modified form of the magnetic head illustrated in FIG. 8.

Although the auxiliary magnetic pole is provided for the purpose of completing the closed magnetic path in the above-mentioned embodiments, the auxiliary magnetic pole may be formed in the magnetic tape in the form of a magnetic coating layer 26, as illustrated in FIG. 10.

Figure 11:
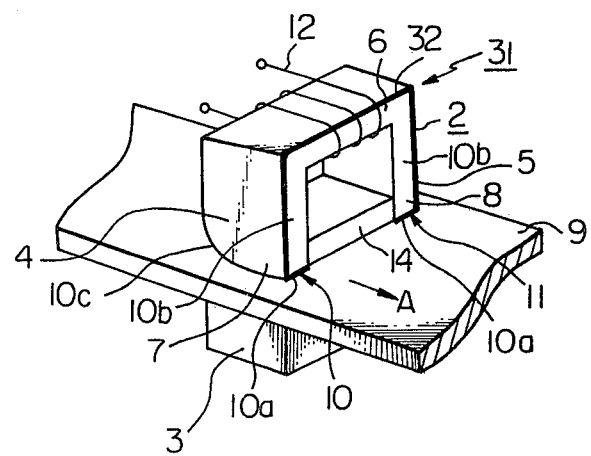
FIG. 11 is a perspective view of a further embodiment of a magnetic head acording to the present invention.

In FIG. 11, there is illustrated another embodiment of the magnetic head according to the present invention. The construction of a magnetic head 31 in FIG. 11 is the same as that of the magnetic head 1 illustrated in FIG. 1, except that a magnetic thin film is coated on each surface of the walls of the leg portions. Each wall is a rear side wall of said magnetic head 31 at the tim the head 31 moves relative to the tape 9. Since the magnetic head 31 is constructed in the same manner as the magnetic head 1, each portion of the magnetic head 31 corresponding to a similar portion of the magnetic head 1 is represented by the same reference numeral as used in FIG. 1. In the magnetic head 31, a magnetic thin film 32 is coated on each of the perpendicular surfaces 10b. For example, when the magnetic head 31 does not move and the magnetic tape 9 moves in the direction indicated by the arrow A, each perpendicular surface 10b becomes a surface of the rear wall of a leg portion. The magnetic thin film 32 may be made, for example, of a permalloy and the thickness of the film is, for example, approximately 1000[A] or less.

The operation of the magnetic head 31 is basically the same as that of the magnetic head 1. However, since the magnetic thin film 32 is coated on the surfaces 10b, the coefficient of demagnetization in the direction perpendicular to the surface of the magnetic thin film 32 becomes 1. Namely, the demagnetization can be perfectly carried out and the magnetization is carried out only in the direction along the surface of the magnetic thin film 32. When the thickness of the magnetic thin film 32 is sufficiently thin, the condition of the magnetic domain of the magnetic thin film material becomes a condition of a single domain. The magnetic thin film which is formed under the application of the uniform magnetic field has the characteristics of one-axis anisotropy in the film surface. Since the directions in which the magnetization can be carried out in a stable condition are only two, which are opposite to each other, the inversion speed of the magnetization is extremely high and the characteristics of crystal anisotropy or stress anisotropy scarcely appear. Therefore, only the characteristics of the one-axis anisotropy is called in question.

Figure 12:
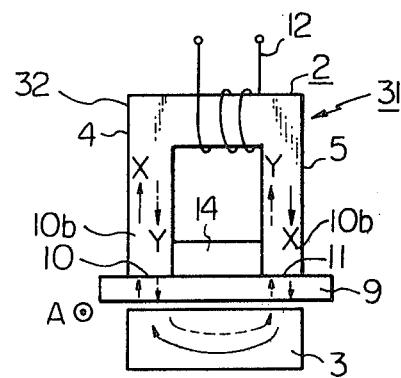
FIG. 12 is a front view of the magnetic head illustrated in FIG. 11.

Although the core 2 is magnetized when the recording signal is applied to the coil 12 during the magnetic recording operation, due to the magnetic thin film 32, each of the perpendicular surfaces 10a which is on the rear side of the leg portion when the relative motion occurs between the magnetic head 31 and the magnetic tape 9, can be magnetized only in the direction indicated by the arrows X or Y in FIG. 12. Consequently, since the magnetic flux from the sharp edge portion 11 passes through the magnetic tape 9 and reaches the magnetic auxiliary pole 3, a closed magnetic path which is perpendicular to the surface of the magnetic tape 9 is easily formed. As a result, the magnetic tape 9 is magnetized in the direction perpendicular to the surface of the tape 9 and, the magnetic recording operation can be effectively carried out.

In the reproducing operation, due to the magnetic thin film 32, the magnetic flux produced by the component of the magnetic field recorded on the magnetic tape 9, which component is perpendicular to the surface of the tape 9, comes into the core 2 from the sharp edge portion 10 or 11, and the core 2 can be easily magnetized in the perpendicular direction. Therefore, a reproducing signal having a higher level, as compared with the level obtained by the conventional head can be obtained from the coil 12.

In FIG. 13 there is illustrated a modified embodiment of the magnetic bead 31. The construction of a magnetic head 41 is the same as that of the above-mentioned magnetic head 31 except that a magnetic thin film is coated on each surface of the walls of the leg portions in the same manner as with the magnetic head 21. In FIG. 31, each portion of the magnetic head 41 corresponding to each portion of the magnetic head 21 is indicated by the same reference as that used in FIG. 7. In the magnetic head 41, a magnetic thin film 42 is coated on each of the perpendicular surfaces 24b as will be understood from FIG. 14. As will be understood from foregoing explanation, when the magnetic tape 9 moves in the direction indicated by the arrow D, since each surface 41b of the leg portions 4 and 5 is the rear wall of each leg portion, the magnetic thin film should be coated on each of the surfaces 41b. The magnetizing condition of the magnetic head 41 is similar to the condition illustrated in FIG. 12. The magnetic head 41 can also carry out the effective recording operation or reproducing operation due to the action of the magnetic thin film.

FIG. 15 illustrates a further modified embodiment of the magnet head 31. A magnetic head 51, illustrated in FIG. 15, is the same as the above-mentioned magnetic head 21', except that each rear side of the leg portions is coated with the magnetic thin film in the same manner as the magnetic head 41. In this magnetic head 51, when the magnetic tape 9 moves in the direction indicated by the arrow A the magnetic thin film should be coated on the perpendicular surface 24b. On the other hand, when the magnetic tape 9 moves in the direction indicated by the arrow D the magnetic thin film should be coated on a surface 53 including the edge line 24g. The operation of the magnetic head 51 will be easily understood from foregoing explanation set forth with reference to FIGS. 11 and 12.

What is claimed is:

1. A magnetic head for exchanging a signal between said magnetic head and a magnetic recording medium during relative motion between said magnetic head and said magnetic recording medium, comprising:

a first magnetic member having a pair of magnetic leg portions and a connecting portion magnetically connected between said magnetic leg portions, each of said magnetic leg portions including an end portion facing said magnetic recording medium said end portion having only one sharp edge line, substantially perpendicular to the direction of said relative motion;

a coil wound on said first magnetic member; and a second magnetic member for forming a closed magnetic path together with said first magnetic member, said second magnetic member facing both of said end portions of said first magnetic member in such a manner that said magnetic recording medium is positioned between said first magnetic member and said second magnetic member, wherein the direction of the magnetic recording field applied to the magnetic recording medium is perpendicular to the surface of the magnetic recording medium such that the magnetic flux passes transversely through the magnetic recording medium whereby the magnetic recording is in the vertical magnetization mode.

2. A magnetic head as recited in claim 1, wherein said second magnetic member is a magnetic layer which is provided on said recording medium.

3. A magnetic head as recited in claim 1, wherein non-magnetic material is inserted between said end portions of said magnetic leg portions as a spacer.

4. A magnetic head as recited in claim 1, wherein one side wall forming said sharp edge line is formed as a curved surface and the other side wall forming said sharp edge line is formed as a surface perpendicular to the surface of said magnetic recording medium.

5. A magnetic head as recited in claim 4, wherein a non-magnetic material is coated on the other side wall of said sharp edge line, whereby the other side wall is mechanically protected from wear.

6. A magnetic head as recited in claim 5, wherein said non-magnetic material is a non-magnetic metal conductor.

7. A magnetic head as recited in claim 1, wherein each of said end portions which face said magnetic recording medium is formed as a flat surface.

8. A magnetic head as recited in claim 7, wherein the shape of said flat surface is a trapezoid and one of the non-parallel edges of said trapezoid is said sharp edge.

9. A magnetic head as recited in claim 7, wherein each said flat surface is formed in such a way that the distance between said leg portions is minimum at the portion of the sharp edge line and gradually increases from the sharp edge line along the flat surfaces.

10. A magnetic head as recited in claim 7, wherein a non-magnetic material with high conductivity is inserted between said leg portions.

11. A magnetic head as recited in claims 3, 4, or 7, wherein a magnetic thin film is coated on at least one surface of a rear wall of said leg portions.

* * * * *